(12) United States Patent
Nakamura et al.

(10) Patent No.: US 11,966,122 B2
(45) Date of Patent: Apr. 23, 2024

(54) LIGHT CONTROL SHEET

(71) Applicant: TOPPAN Inc., Taito-ku (JP)

(72) Inventors: Gen Nakamura, Taito-ku (JP); Toshiji Yasuhara, Taito-ku (JP); Taisuke Enya, Taito-ku (JP); Yuka Kurokawa, Taito-ku (JP); Yusuke Takahashi, Taito-ku (JP)

(73) Assignee: TOPPAN Inc., Taito-ku (JP)

( * ) Notice: Subject to any disclaimer, the term of this patent is extended or adjusted under 35 U.S.C. 154(b) by 0 days.

(21) Appl. No.: 18/077,491

(22) Filed: Dec. 8, 2022

(65) Prior Publication Data

US 2023/0108148 A1 Apr. 6, 2023

Related U.S. Application Data

(63) Continuation of application No. PCT/JP2021/022384, filed on Jun. 11, 2021.

(30) Foreign Application Priority Data

Jun. 11, 2020 (JP) .................................. 2020-101877

(51) Int. Cl.
*G02F 1/1337* (2006.01)
*G02F 1/00* (2006.01)
*G02F 1/13* (2006.01)

(52) U.S. Cl.
CPC ...... *G02F 1/133773* (2021.01); *G02F 1/0045* (2013.01); *G02F 1/1316* (2021.01)

(58) Field of Classification Search
CPC ............ G02F 1/133773; G02F 1/0045; G02F 1/13347
See application file for complete search history.

(56) References Cited

U.S. PATENT DOCUMENTS

2006/0250545 A1 11/2006 Hsieh et al.
2013/0229606 A1* 9/2013 Asaoka ................. G02F 1/1334
349/123
2019/0278115 A1 9/2019 Khan et al.

FOREIGN PATENT DOCUMENTS

CN 201242632 Y 5/2009
CN 106753428 A 5/2017
(Continued)

OTHER PUBLICATIONS

English Machine Translation of JP 2019 20560 Baba (Year: 2023).*
(Continued)

*Primary Examiner* — Donald L Raleigh
(74) *Attorney, Agent, or Firm* — Oblon, McClelland, Maier & Neustadt, L.L.P.

(57) ABSTRACT

A light control sheet including a first transparent electrode layer, a second transparent electrode layer, a light control layer including a resin layer which is formed between the first and second transparent electrode layers and includes a liquid crystal composition in holes formed in the resin layer, the liquid crystal composition including liquid crystal molecules, and a first alignment layer formed between the first transparent electrode layer and the light control layer such that a haze of the light control layer is increased upon application of a voltage to the first transparent electrode layer. The light control layer includes a first high-density portion and a low-density portion, and the first high-density portion is in contact with the first alignment layer and includes the liquid crystal composition at a density higher than a density of the liquid crystal composition in the low-density portion per unit thickness of the light control layer.

20 Claims, 6 Drawing Sheets

(56) References Cited

FOREIGN PATENT DOCUMENTS

| JP | 2019020560 A | * | 2/2019 | ............... G02F 1/13 |
|----|--------------|---|--------|---------------------------|
| JP | 2019-194654 A | | 11/2019 | |
| JP | 2020-077484 A | | 5/2020 | |

OTHER PUBLICATIONS

Search Report dated Aug. 24, 2021 in International Application No. PCT/JP2021/022384 filed Jun. 11, 2021, 5 pages (with English Translation).
Extended European Search Report dated Oct. 4, 2023 in European Patent Application No. 2182133.0, 10 pages.

* cited by examiner

LIGHT CONTROL SHEET

CROSS-REFERENCE TO RELATED APPLICATIONS

The present application is a continuation of International Application No. PCT/JP2021/022384, filed Jun. 11, 2021, which is based upon and claims the benefits of priority to Japanese Application No. 2020-101877, filed Jun. 11, 2020. The entire contents of all of the above applications are incorporated herein by reference.

BACKGROUND OF THE INVENTION

Field of the Invention

The present invention generally relates to a reverse-type light control sheet including an alignment layer.

Discussion of the Background

A reverse-type light control sheet includes: a light control layer containing liquid crystal molecules, and a pair of alignment layers which is in contact with the light control layer and holds the light control layer therebetween. Each alignment layer may be, for example, a vertical alignment layer, which aligns the liquid crystal molecules so that the long axis of each liquid crystal molecule is substantially perpendicular to the alignment layer when no potential difference is generated between the pair of transparent electrode layers. Therefore, the reverse-type light control sheet is transparent when there is no potential difference between the pair of transparent electrode layers. On the other hand, when there is a potential difference between the pair of transparent electrode layers, the liquid crystal molecules are oriented perpendicular to the electric field direction, whereby the light control sheet has an opaque state (see, for example, JP 2019-194654 A).

SUMMARY OF THE INVENTION

According to an aspect of the present invention, a light control sheet includes a first transparent electrode layer that receives a voltage, a second transparent electrode layer, a light control layer including a resin layer which is formed between the first transparent electrode layer and the second transparent electrode layer and includes a liquid crystal composition in holes formed in the resin layer, the liquid crystal composition including liquid crystal molecules, and a first alignment layer formed between the first transparent electrode layer and the light control layer such that a haze of the light control layer is increased in response to application of the voltage to the first transparent electrode layer. The light control layer includes a first high-density portion and a low-density portion, and the first high-density portion is in contact with the first alignment layer and includes the liquid crystal composition at a density higher than a density of the liquid crystal composition in the low-density portion per unit thickness of the light control layer.

According to another aspect of the present invention, a light control sheet includes a first transparent electrode layer that receives a voltage, a second transparent electrode layer, a light control layer including a resin layer which is formed between the first transparent electrode layer and the second transparent electrode layer and includes a liquid crystal composition in holes formed in the resin layer, the liquid crystal composition including liquid crystal molecules, and an alignment layer formed between the first transparent electrode layer and the light control layer such that a haze of the light control layer is increased in response to application of the voltage to the first transparent electrode layer. The light control layer has a central portion of a thickness of the light control layer, and the central portion is lowest in density in the thickness of the light control layer.

According to a still another aspect of the present invention, a light control sheet includes a first transparent electrode layer that receives a voltage, a second transparent electrode layer, a light control layer including a resin which is formed between the first transparent electrode layer and the second transparent electrode layer and includes a liquid crystal composition in holes formed in the resin layer, the liquid crystal composition including liquid crystal molecules, and an alignment layer formed between the first transparent electrode layer and the light control layer such that a haze of the light control layer is increased by application of the voltage to the first transparent electrode layer. The light control layer has a thickness which is 2 times or more of a minimum of hole sizes and less than 10 μm, and the holes each have a size of 0.38 μm-3.0 μm.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
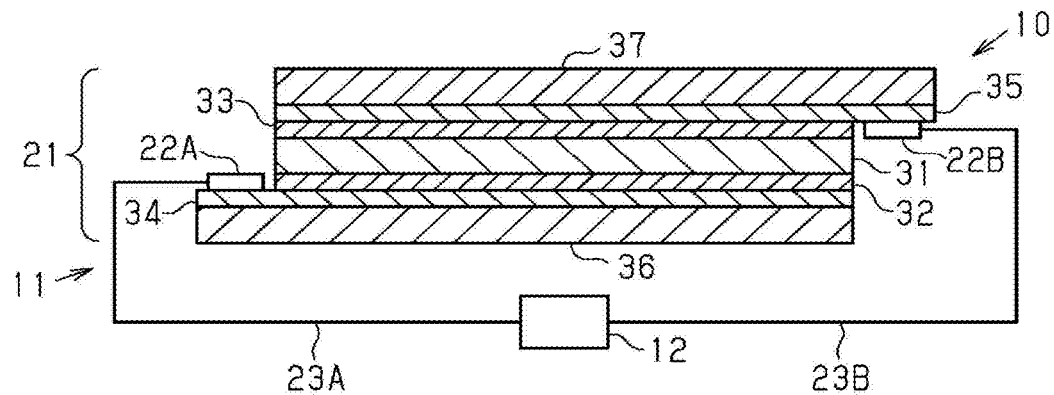
FIG. 1 is a cross-sectional view showing a structure of a light control device according to an embodiment together with a driving unit.

The embodiments will now be described with reference to the accompanying drawings, wherein like reference numerals designate corresponding or identical elements throughout the various drawings.

With reference to FIGS. 1 to 16, an embodiment of a light control sheet will be described. In the following description, the light control device, the light control sheet, and examples will be sequentially described.

<Light Control Device>

With reference to FIG. 1, the light control device will be described.

As shown in FIG. 1, the light control device 10 includes a light control unit 11 including a reverse-type light control sheet 21, and a driving unit 12.

The light control sheet 21 includes a light control layer 31, a first alignment layer 32, a second alignment layer 33, a first transparent electrode layer 34, and a second transparent electrode layer 35. In the light control sheet 21, the first alignment layer 32 and the second alignment layer 33 hold the light control layer 31 therebetween in the thickness-wise direction of the light control layer 31. The first transparent electrode layer 34 and the second transparent electrode layer 35 hold a pair of alignment layers 32 and 33 therebetween in the thickness-wise direction of the light control layer 31. The light control sheet 21 further includes a first transparent substrate 36 which supports the first transparent electrode layer 34 and a second transparent substrate 37 which supports the second transparent electrode layer 35.

The light control unit 11 includes a first electrode 22A attached to a portion of the first transparent electrode layer 34, and a second electrode 22B attached to a portion of the second transparent electrode layer 35. The light control unit 11 further includes a first conductive wire 23A connected to the first electrode 22A, and a second conductive wire 23B connected to the second electrode 22B. The first electrode 22A is connected to the driving unit 12 by the first wiring 23A, and the second electrode 22B is connected to the driving unit 12 by a second wiring 23B.

The light control layer 31 includes a transparent resin layer and a liquid crystal composition. The resin layer has holes in which the liquid crystal composition is filled. The liquid crystal composition occupies the holes of the resin layer. The liquid crystal composition contains liquid crystal molecules. Examples of liquid crystal molecules include those selected from the group consisting of Schiff base, azo, azoxy, biphenyl, terphenyls, benzoic acid esters, tolan types, pyrimidines, cyclohexanecarboxylic acid esters, phenylcyclohexanes, and dioxanes.

The thickness of the light control layer 31 is 2 times or more of a minimum of sizes of the holes and 10 μm or less, and for example, 2 μm or more and less than 10 μm is preferable. Further, the light control layer 31 preferably has a thickness of 3.0 μm or more 8.0 μm or less. If the thickness of the light control layer 31 is less than twice the size of the hole, this would not be preferable because it would be difficult to generate at least two regions having relatively different densities within the light control layer 31, as described below. Further, if the thickness of the light control layer 31 exceeds 10 μm, it is not preferable because the liquid crystal molecules cannot be properly separated from the transparent resin layer when the coating liquid containing liquid crystal molecules is exposed during the production of the light control sheet 21.

The type in which the liquid crystal composition is held is one selected from the group consisting of a polymer network type, a polymer dispersion type, and a capsule type. The polymer network type has a transparent polymer network with three-dimensional meshes, and holds the liquid crystal composition in mesh-like holes which communicate with each other. The polymer network is an example of a resin layer. The polymer dispersion type has a large number of isolated holes in a polymer layer, and holds the liquid crystal composition in each of the holes dispersed in the polymer layer. The capsule type holds the capsule-like liquid crystal composition in the resin layer. In addition to the liquid crystal molecules described above, the liquid crystal composition may contain a monomer for forming a resin layer and a dichroic dye.

The materials for forming the first alignment layer 32 and the second alignment layer 33 are organic compounds, inorganic compounds, and mixtures thereof. Examples of the organic compounds include polyimide, polyamide, polyvinyl alcohol, and cyanide compound. Examples of the inorganic compounds include silicon oxides and zirconium oxide. The material for forming the alignment layers 32 and 33 may be silicone. Silicone is a compound having an inorganic portion and an organic portion. The thickness of each of the alignment layers 32 and 33 is, for example, 0.02 μm or more 0.5 μm or less.

The first alignment layer 32 and the second alignment layer 33 are, for example, a vertical alignment layer, or a horizontal alignment layer. The vertical alignment layer aligns the longitudinal direction of the liquid crystal molecules so as to be perpendicular to a surface on a side opposite to that in contact with the first transparent electrode layer 34 and a surface on a side opposite to that in contact with the second transparent electrode layer 35. The horizontal alignment layer aligns the longitudinal direction of the liquid crystal molecules so as to be substantially parallel to the surface on a side opposite to that in contact with the first transparent electrode layer 34 and the surface on a side opposite to that in contact with the second transparent electrode layer 35. Thus, regardless of whether the alignment layers 32 and 33 is a vertical alignment layer or a horizontal alignment layer, the alignment layers 32 and 33 regulate the alignment of the plurality of liquid crystal molecules contained in the light control layer 31. When at least one of the alignment layers 32 and 33 is a horizontal alignment layer, the light control sheet 21 can include a polarizing layer.

The first transparent electrode layer 34 and the second transparent electrode layer 35 have optical transparency that transmits visible light. The optical transparency of the first transparent electrode layer 34 enables visual recognition of objects through the light control sheet 21. The optical transparency of the second transparent electrode layer 35, like the optical transparency of the first transparent electrode layer 34, enables visual recognition of objects through the light control sheet 21. The thickness of each of the transparent electrode layers 34 and 35 is set to, for example, 0.005 µm or more 0.1 µm or less. Thus, it is possible to reduce occurrence of cracks when being flexed, while ensuring proper driving of the light control sheet 21.

The material for forming the transparent electrode layers 34 and 35 may be any one selected from the group consisting of, for example, indium tin oxide, fluorine-doped tin oxide, tin oxide, zinc oxide, carbon nanotubes, and poly(3,4-ethylenedioxythiophene).

The material for forming the transparent substrates 36 and 37 may be a synthetic resin or an inorganic compound. Examples of the synthetic resin include polyester, polyacrylate, polycarbonate, and polyolefin. Examples of the polyester includes polyethylene terephthalate and polyethylene naphthalate. The polyacrylate is, for example, polymethyl methacrylate. Examples of the inorganic compound include silicon dioxide, silicon oxynitride, and silicon nitride. The thickness of each of the transparent substrates 36 and 37 is, for example, 16 µm or more and 250 µm or less. If the thickness of the transparent substrates 36 and 37 is below the lower limit of 16 µm, processing and construction of the light control sheet 21 become difficult. If the thickness of the transparent substrates 36 and 37 exceeds the upper limit of 250 µm, it becomes difficult to produce the light control sheet 21 by a roll-to-roll process.

The electrodes 22A and 22B is, for example, a flexible printed circuit board (FPC: Flexible Printed Circuits). FPC includes a support layer, a conductor portion, and a protective layer. The conductor portion is arranged between the support layer and the protective layer. The support layer and the protective layer is formed of an insulating synthetic resin. The support layer and the protective layer are formed, for example, by polyimide. The conductor portion is formed of, for example, a metal thin film. The material for forming the metal thin film may be, for example, copper. The electrodes 22A and 22B is not limited to FPC, and may be for example, a metal tape.

Each of the electrodes 22A and 22B is attached to a corresponding one of the transparent electrode layers 34 and 35 by a conductive adhesive layer (not shown). Each of the electrodes 22 A and 22 B have a portion connected to a corresponding one of the conductive adhesive layers. In each portion, the conductor portion is exposed from the protective layer or the support layer.

The conductive adhesive layer may be formed of, for example, an anisotropic conductive film (ACF), an anisotropic conductive paste (ACP), an isotropic conductive film (ICF), and an isotropic conductive paste (ICP). The conductive adhesive layer is preferably an anisotropic conductive film, from the viewpoint of handleability in the production process of the light control device 10.

Each of the conductive wires 23A and 23B is formed of, for example, a metal wire and an insulating layer covering the metal wire. The wire is formed of, for example, copper.

The driving unit 12 applies an AC voltage between the first transparent electrode layer 34 and the second transparent electrode layer 35. The driving unit 12 preferably applies an AC voltage having a rectangular waveform shape between the pair of transparent electrode layers 34 and 35. Note that the driving unit 12 may apply an AC voltage having a shape other than a rectangular waveform between the pair of transparent electrode layers 34 and 35. For example, the driving unit 12 may apply an AC voltage having a sinusoidal waveform between the pair of transparent electrode layers 34 and 35.

The light control layer 31 changes the orientation of the liquid crystal molecules in response to a change in voltage generated between the two transparent electrode layers 34 and 35. The change in orientation in the liquid crystal molecules changes the degree of scattering, absorption, and transmission of visible light entering the light control layer 31. When the reverse-type light control sheet 21 is energized, that is, when a potential difference is applied between the first transparent electrode layer 34 and the second transparent electrode layer 35, the light control sheet 21 has a relatively high haze. The reverse-type light control sheet 21 has relatively low haze when the light control sheet 21 is not energized, that is, when there is no potential difference between the first transparent electrode layer 34 and the second transparent electrode layer 35. For example, the reverse-type light control sheet 21 has an opaque state when the light control sheet 21 is energized, and has a transparent state when the light control sheet 21 is not energized.

The light control device 21 is attached, for example, to a window of a moving body such as a vehicle and an aircraft. The light control sheet 21 is attached, for example, to windows provided in various buildings such as houses, stations, and airports, partitions installed in offices, store windows installed in stores, and screens for projecting images. The shape of the light control sheet 21 may be flat or curved.

<Light Control Sheet>

Figure 2:
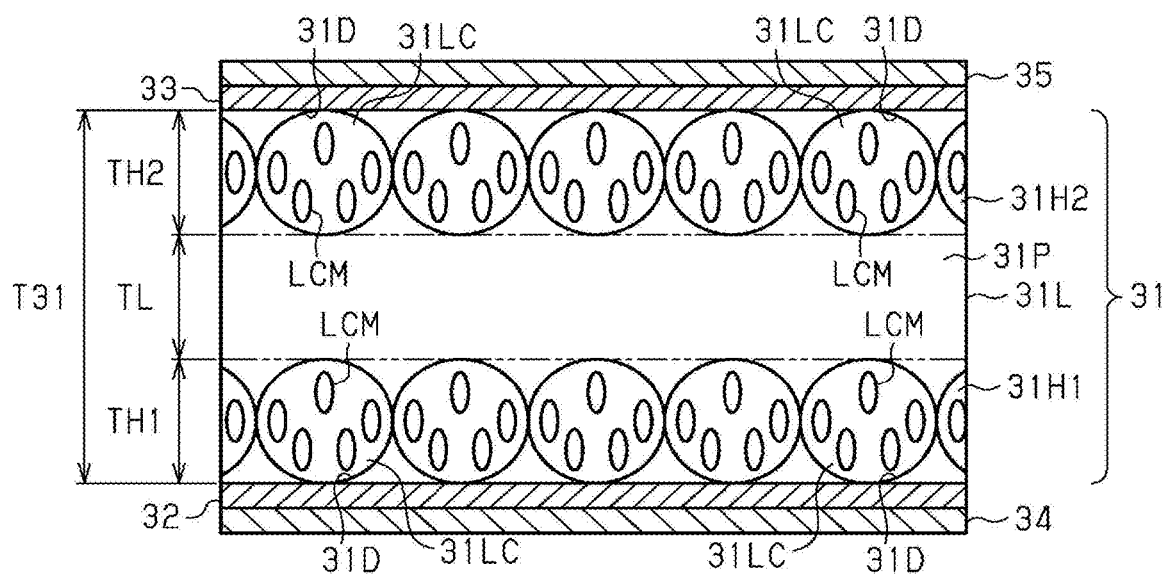
FIG. 2 is a cross-sectional view schematically showing an example of a structure of a light control sheet provided in the light control device shown in FIG. 1.
Figure 3:
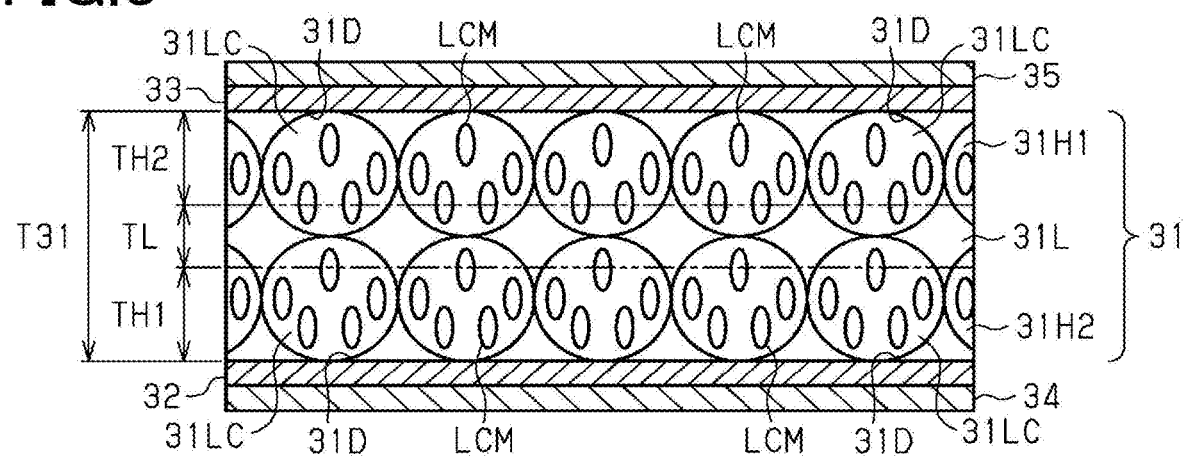
FIG. 3 is a cross-sectional view schematically showing another example of a structure of the light control sheet provided in the light control device shown in FIG. 1.
Figure 4:
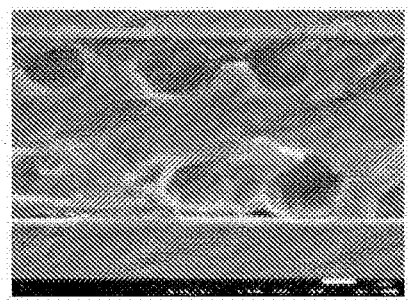
FIG. 4 is an SEM image obtained by capturing a cross-sectional structure of a light control sheet of Example 1.
Figure 5:
FIG. 5 is an SEM image obtained by capturing a cross-sectional structure of a light control sheet of Example 2.
Figure 6:
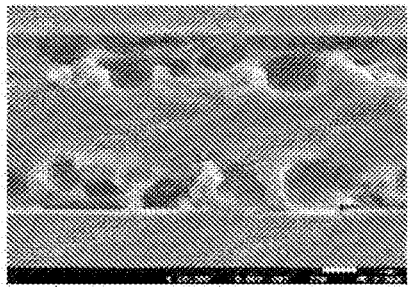
FIG. 6 is an SEM image obtained by capturing a cross-sectional structure of a light control sheet of Example 3.
Figure 7:
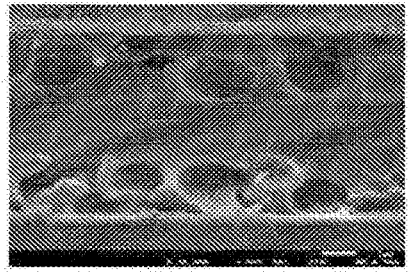
FIG. 7 is an SEM image obtained by capturing a cross-sectional structure of a light control sheet of Example 4.
Figure 8:
FIG. 8 is an SEM image obtained by capturing a cross-sectional structure of a light control sheet of Example 5.
Figure 9:
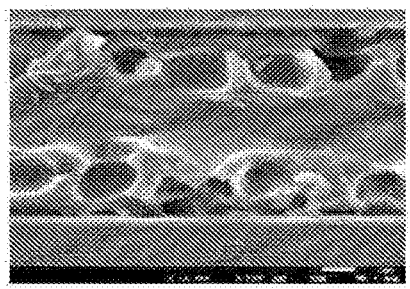
FIG. 9 is an SEM image obtained by capturing a cross-sectional structure of a light control sheet of Example 6.
Figure 10:
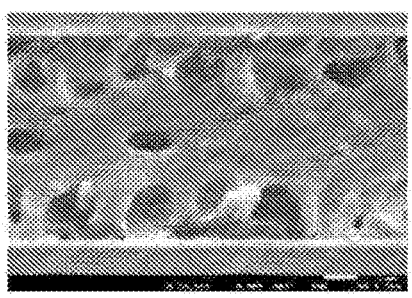
FIG. 10 is an SEM image obtained by capturing a cross-sectional structure of a light control sheet of Example 7.

With reference to FIGS. 2 and 3, the structure of the light control sheet 21 will be described in more detail.

FIGS. 2 and 3 schematically show a cross-sectional structure of the light control sheet 21. In FIGS. 2 and 3, for the convenience of illustration, the transparent substrates 36 and 37 are not illustrated. In FIGS. 2 and 3, for convenience of describing the structure of the light control layer 31, the thickness of the alignment layers 32 and 33 and the ratio of the thickness of the light control layer 31 to the thickness of the transparent electrode layers 34 and 35 are larger than the actual ratio. Further, FIGS. 2 and 3 show the state of the light control layer 31 in a state in which no potential difference is generated between the pair of transparent electrode layers 34 and 35.

As shown in FIG. 2, the light control sheet 21 includes the first transparent electrode layer 34 which is configured to receive voltage, the second transparent electrode layer 35, the light control layer 31, and the first alignment layer 32. The light control layer 31 includes a resin layer 31P and liquid crystal composition LC. The resin layer 31P is located between the first transparent electrode layer 34 and the second transparent electrode layer 35, and holes 31D are dispersed in the resin layer 31P. The liquid crystal composition 31LC contains liquid crystal molecules LCM and occupies each of the holes 31D. The first alignment layer 32 is arranged between the first transparent electrode layer 34 and the light control layer 31. The first alignment layer 32 is configured to increase the haze of the light control layer 31 in response to application of voltage. The light control layer 31 includes a first high-density portion 31H1 and a low-density portion 31L. The first high-density portion 31H1 is higher in density of the liquid crystal composition 31LC per unit thickness thereof than the low-density portion 31L. The low-density portion 31LC is lower in density of the liquid crystal composition 31LC per unit thickness thereof than the first high-density portion 31H1. The first high-density portion 31H1 is in contact with the first alignment layer 32.

In other words, in the light control layer 31, the density of the liquid crystal composition 31LC is the lowest in a central portion of the light control layer 31 in the thickness of the light control layer 31. Note that the central portion of the light control layer 31 in the thickness of the light control layer 31 is a portion of the light control layer 31 which is closer to the central area of the light control layer 31 than are the pair of surfaces facing away from each other in the thickness-wise direction of the light control layer 31. The density of the liquid crystal composition 31LC per unit thickness in each portion of the light control layer 31 is calculated by dividing the volume of the liquid crystal composition 31LC included in each portion of the light control layer 31 by the thickness of each portion of the light control layer 31. Further, in the light control layer 31, it is preferable that the density of the liquid crystal composition 31LC at a portion including the center of the light control layer 31 in the thickness of the light control layer 31 is lowest. Since the light control layer 31 is very thin, it is practically difficult to determine the volume of the liquid crystal composition 31LC included in the light control layer 31. Therefore, in the present disclosure, the respective densities are calculated using the area of the liquid crystal composition 31LC obtained by capturing the cross section of the light control layer 31 obtained from the SEM image and the area of the light control layer 31.

The first alignment layer 32 is, for example, a vertical alignment layer, and the first alignment layer 32 typically aligns the liquid crystal molecules LCM so that the long axis of the liquid crystal molecules LCM is perpendicular to the first transparent electrode layer 34. In the range where the long axis of the liquid crystal molecules LCM is determined to be substantially perpendicular to the first transparent electrode layer 34, the first alignment layer 32 may orient the liquid crystal molecules LCM so that the long axis of the liquid crystal molecules LCM is tilted by several degrees with respect to being perpendicular to the first transparent electrode layer 34. Further, the density of the liquid crystal composition 31LC in the first high-density portion 31H1 is higher than the density of the liquid crystal composition 31LC in the low-density portion 31L.

Since the density of the liquid crystal composition 31LC is high in a region where the distance from the first alignment layer 32 is small, the amount of liquid crystal molecules LCM aligned by the alignment regulating force of the first alignment layer 32 can be increased in a plurality of liquid crystal molecules LCM. Therefore, it is possible to increase the transparency of the light control sheet 21 even when there is no voltage difference between the first transparent electrode layer 34 and the second transparent electrode layer 35.

The transparency of the light control sheet 21 can be represented by the visible light transmittance of the light control sheet 21. The transparency of the light control sheet 21 can also be expressed by the haze of the light control sheet 21. The haze is measured by a method in accordance with JIS K 7136:2000. In the light control sheet 21, the transparency of the light control sheet 21 is higher as the haze value is lower, and the transparency of the light control sheet 21 is lower as the haze value is higher.

As described above, the light control sheet 21 further includes a second alignment layer 33 between the light control layer 31 and the second transparent electrode layer 35 in the thickness-wise direction of the light control layer 31. The light control layer 31 further includes a second high-density portion 31H2. The second high-density portion 31H2 is in contact with the second alignment layer 33, and has a density of the liquid crystal composition 31LC higher than the density of the liquid crystal composition 31LC in the low-density portion 31L. The low-density portion 31L is arranged between the first high-density portion 31H1 and the second high-density portion 31H2 in a thickness-wise direction, as viewed in a cross section of the light control layer.

In the light control layer 31, the liquid crystal molecules LCM are aligned in accordance with the alignment regulating force of the alignment layers 32 and 33 in the vicinity of a pair of surfaces facing away from each other in the thickness-wise direction of the light control layer 31. Therefore, when there is no potential difference between the first transparent electrode layer 34 and the second transparent electrode layer 35, the light transmittance of the light control sheet 21 can be further enhanced. That is, it is possible to reduce the haze of the light control sheet 21.

The light control layer 31 includes the first high-density portion 31H1, the second high-density portion 31H2, and the low-density portion 31L. In a cross section along the thickness-wise direction of the light control layer 31, the value obtained by dividing the areas of the holes 31D by the thickness of the light control layer 31 is the density of the holes 31D per unit thickness thereof. The density of the holes 31D in the first high-density portion 31 H1 per unit thickness thereof and the density of the holes 31D in the second high-density portion 31H2 per unit thickness thereof are higher than the density of the holes 31D in the low-density portion 31L per unit thickness thereof.

Therefore, the density of the liquid crystal composition 31LC in the first high-density portion 31H1 and the density of the liquid crystal composition 31LC in the second high-density portion 31H2 can be made higher than the density of the liquid crystal composition 31LC in the low-density portion 31L.

The density of the holes 31D per unit thickness thereof is calculated by dividing a sum of areas of the holes 31D in each portion by the thickness of each portion.

In the light control layer 31, for example, the thickness TH1 of the first high-density portion 31H1, the thickness TH2 of the second high-density portion 31H2, and the thickness TL of the low-density portion 31L are substantially equal to each other. That is, the thickness TH1 of the first high-density portion 31H1, the thickness TH2 of the second high-density portion 31H2, and, the thickness TL of the low-density portion 31L are each approximately ⅓ of the thickness T31 of the light control layer 31. The thickness TL of the low-density portion 31L may be thicker or thinner than the thicknesses TH1 and TH2 of the respective high-density portions 31H1 and 31H2. Additionally, the thickness TH1 of the first high-density portion 31H1 may be equal to or different from the thickness of the second high-density portion 31H2.

In a cross section of the light control layer 31 which is cut in a thickness-wise direction of the light control layer, a ratio of a sum (SD) of areas of the holes 31D in the low-density portion to an area (SL) of the low-density portion 31L, as expressed in percentage ([SD/SL]×100), is preferably 10% or less. As a result, since it is possible to reduce the ratio of the liquid crystal composition 31LC held by the holes 31D in the low-density portion 31L, the liquid crystal molecules LCM contained in the low-density portion 31L suppress increasing the opacity of the light control sheet 21 in a state where no potential difference is generated between the first transparent electrode layer 34 and the second transparent electrode layer 35.

The low-density portion 31L preferably has no holes 31D In other words, the low-density portion 31L preferably does not include the liquid crystal composition 31LC. As a result, all the liquid crystal molecules LCM contained in the light control layer 31 are easily aligned in accordance with the alignment regulating force of the alignment layers 32 and 33. Therefore, the haze of the light control sheet 21 in a state where a voltage difference does not occur between the first transparent electrode layer 34 and the second transparent electrode layer 35 can be further reduced.

Thus, in the low-density portion 31L, the ratio of the sum SD of the areas of the holes 31D to the area SL of the low-density portion 31L is preferably 10% or less, more preferably 5% or less, and most preferably 0%.

The holes 31D can be located in a range of 3.0 µm or less from the first alignment layer 32 and within a range of 3.0 µm or less from the second alignment layer 33 in the cross section along the thickness-wise direction of the light control layer 31. In other words, the thickness TH1 of the first high-density portion 31H1 is 3.0 µm or less, and the thickness TH2 of the second high-density portion 31H2 is 3.0 µm or less.

The range in which the holes 31D are located with respect to the first alignment layer 32 is the maximum distance between the holes 31D, located closer to the first alignment layer 32 than the central area of the light control layer 31 is, and the surface of the first alignment layer 32 that is in contact with the light control layer 31 in the cross-section of the light control layer 31 in the thickness of the light control layer 31. The range in which the holes 31D are located with respect to the second alignment layer 33 is the maximum distance between the holes 31D, located closer to the second alignment layer 33 than the central area of the light control layer 31 is, and the surface of the second alignment layer 33 that is in contact with the light control layer 31 in the cross-section of the light control layer 31 in the thickness of the light control layer 31.

Since the holes 31D are located within a range of 3.0 µm or less from each of the alignment layers 32 and 33 in the cross section of the light control layer 31 in the thickness of the light control layer 31, it is possible to increase the reliability of the liquid crystal molecules LCM held in each of the holes 31D being aligned according to the alignment regulating force.

The holes 31D contained in the first high-density portion 31H1 are preferably in contact with the first alignment layer 32. It is preferable that the holes 31D in the second high-density portion 31H2 are in contact with the second alignment layer 33. In other words, it is preferable that the plurality of holes 31D in the light control layer 31 includes only one hole-layer along the interface between the first alignment layer 32 and the light control layer 31 and another hole layer along the interface between the second alignment layer 33 and the light control layer 31.

Since the respective holes 31D in the first high-density portion 31H1 and the respective holes 31D in the second high-density portion 31H2 can hold the liquid crystal composition 31LC in contact with the alignment layers 32 and 33, the alignment regulating force of the alignment layers 32 and 33 can easily act on the entire liquid crystal composition 31LC held in the respective holes 31D. Thereby, the transparency of the light control sheet 21 can be further enhanced in a state where no potential difference is generated between the first transparent electrode layer 34 and the second transparent electrode layer 35.

On the other hand, the light control sheet 21 of the present disclosure can also be defined by the thickness of the light control layer 31 and the size of the holes 31D. That is, in the light control sheet 21, the thickness T31 of the light control layer 31 is 3.0 µm or more and 8.0 µm or less, and the sizes of the holes 31D is 1.0 µm or more and 2.5 µm or less.

Since the thickness of the light control layer 31 is 3.0 µm or more and 8.0 µm or less, the formation of the holes 31D at positions distant from the pair of surfaces facing away from each other in the thickness-wise direction of the light control layer 31 is suppressed. Further, since the size of the hole is 1.0 µm or more and 2.5 µm or less, the liquid crystal composition 31LC is maintained in the vicinity of the alignment layers 32 and 33. Therefore, it is possible to increase the transparency of the light control sheet 21 even when there is no voltage difference between the first transparent electrode layer 34 and the second transparent electrode layer 35.

In view of the scattering properties of the light control sheet 21, the size of the holes 31D is preferably 0.38 µm or more and 3.0 µm or less. By having the size of the holes 31D included in the range of 0.38 µm or more and 3.0 µm or less, it is possible to achieve a suitable degree of scattering generated in the light control sheet 21. If the size of the holes 31D is less than the lower limit of 0.38 µm, it is not preferable since the scattering properties, especially the scattering properties in the visible region, cannot be sufficiently ensured. If the sizes of the holes 31D exceeds the upper limit of 3.0 µm, the optical action of the liquid crystal, that is, the components of the light that passes through the holes become larger than the components of the light that is scattered, and this makes it difficult to provide an appropriate light control effect, which is undesirable.

When the holes 31D have circular shapes in the cross section along the thickness-wise direction of the light control sheet 21, the size of the holes 31D is the diameter of the holes 31D. When the holes 31D have elliptical shapes in the cross section along the thickness-wise direction of the light control sheet 21, the size of the holes 31D is the major diameter of the holes 31D. When the holes 31D each have an irregular shape in the cross section in the thickness of the light control sheet 21, the size of the holes 31D is the diameter of the circle circumscribed by the holes 31D.

In the cross section of the light control layer 31 in the thickness of the light control layer 31, the liquid crystal molecules LCM held at positions where the distance from the alignment layers 32 and 33 is small are more likely to be aligned in accordance with the alignment regulating force of the alignment layers 32 and 33. As described above, when the size of the respective holes 31D is 2.5 µm or less, the liquid crystal molecules LCM held in the respective holes 31D in the high-density portions 31H1 and 31H2 are easily aligned according to the alignment regulating force.

When forming the light control sheet 21, first, the transparent substrates 36 and 37 which support the transparent electrode layers 34 and 35 are prepared. The alignment layers 32 and 33 are formed on the transparent electrode layers 34 and 35, respectively. The coating liquid is then applied between the pair of alignment layers 32 and 33. The coating liquid contains a polymerizable composition for forming the resin layer 31P and liquid crystal molecules LCM. The polymerizable composition is a monomer or oligomer which can be polymerized by irradiation with ultraviolet light. The coating liquid is then irradiated with ultraviolet light through the transparent electrode layers 34 and 35, and thus a resin layer 31P having holes 31D is formed, and liquid crystal molecules LCM are held in each of the holes 31D.

When the coating liquid is cured, firstly, the liquid crystal composition 31LC containing liquid crystal molecules LCM is separated from the polymerizable composition, and the liquid crystal composition 31LC is located at a plurality of places in the polymerizable composition. The liquid crystal composition 31LC then migrates toward the respective alignment layer 32 and 33 before the polymerizable composition is cured. Then, the polymerizable composition is cured to form a resin layer 31P having holes 31D surrounding the liquid crystal composition 31LC. Until the resin layer 31P is formed, the holes 31D formed in the resin layer 31P continue to expand because separate pieces of the liquid crystal composition 31LC become aggregated. In this regard, if the size of the holes 31D is 1.0 μm or more, it is possible to reduce the possibility that the polymerizable composition is cured before each holes 31D migrates to the vicinity of the alignment layers 32 and 33. As a result, it is possible to reduce the number of holes 31D in the low-density portion 31L of the light control layer 31.

The structure of the light control layer 31 described above with reference to FIG. 2 is an example of a structure that the light control layer 31 can take. The light control layer 31 may have a cross-sectional structure shown in FIG. 3.

As shown in FIG. 3, the light control layer 31 includes one layer of the hole layers formed by a plurality of holes 31D in contact with the first alignment layer 32, and one layer of the hole layers formed by a plurality of holes 31D in contact with the second alignment layer 33. In each of the hole layers, a single hole 31D is arranged along the interface between the alignment layers 32, 33 and the light control layer 31.

The hole layer in contact with the first alignment layer 32 includes at least one of the holes 31D in contact with any of the holes 31D of the hole layer in contact with the second orientation layer 33. All the holes 31D in the hole layer which is in contact with the first orientation layer 32 may be in contact with any of the holes 31D in the hole layer which is in contact with the second alignment layer 33.

In the hole layer in contact with the first alignment layer 32, the surface in contact with the first alignment layer 32 is defined as a first surface, and the surface on a side opposite to the first surface is defined as a second surface. The second surface is a plane containing a portion of the holes 31D in the hole layer that has the largest distance from the first alignment layer 32. In the hole layer in contact with the second alignment layer 33, the surface in contact with the second alignment layer 33 is a first surface, and the surface opposite to the first surface is a second surface. The second surface is a plane containing a portion of the holes 31D in the hole layer that has the largest distance from the second alignment layer 33. The second surface of the hole layer in contact with the first alignment layer 32 and the second surface of the hole layer in contact with the second alignment layer 33 are preferably the same surface.

The light control layer 21 includes the first high-density portion 31H1, the second high-density portion 31H2, and the low-density portion 31L. In the thickness-wise direction of the light control layer 31, the low-density portion 31 L is arranged between the first high-density portion 31H1 and the second high-density portion 31H2. The low-density portion 31L includes a portion where the holes 31D are not present in the hole layer which is in contact with the first alignment layer 32, and also includes a portion where the holes 31D are not present in the hole layer which is in contact with the second alignment layer 33. Therefore, the density of the liquid crystal composition 31LC in the low-density portion 31L is smaller than the density of the liquid crystal composition 31LC in the first high-density portion 31H1 and the density of the liquid crystal composition 31LC in the second high-density portion 31H2.

Also, in the example shown in FIG. 3, the light control layer 31 has a central portion in which the density of the liquid crystal composition 31LC is the lowest in the thickness of the light control layer 31.

EXAMPLES

With reference to FIGS. 4 to 16, examples will be described.

A light control sheets of Examples 1 to 7 and a light control sheet of Comparative Example 1 were obtained by the production method described below.

Example 1

A pair of PET substrates on which an ITO film was formed was prepared. The thickness of the ITO film was 30 nm, and the thickness of the PET substrate was 125 ™. On each ITO film, a vertically oriented layer having a thickness of 100 nm was formed using a bar coater. Next, a coating liquid containing a polymerizable composition and liquid crystal molecules was applied on one of the vertical alignment layers. Then, by placing the other vertically oriented layer on the coating film, the coating film is sandwiched by a pair of vertically oriented layers. Then, the coating film was irradiated with ultraviolet light from both sides in the thickness-wise direction of the coating film through the PET substrate, the ITO film, and the vertical alignment layers.

One factor that affects the quality of the light control sheet is a step of exposing the coating film, specifically, the light control layer, when producing the light control sheet. More specifically, in the exposure step, an optimum exposure amount, in other words, an optimum integrated light quantity, is determined in consideration of various conditions such as the materials contained in the coating liquid and the thickness of the coating film. The integrated light quantity is obtained by multiplying the illuminance of the irradiated ultraviolet light by the irradiation time of the ultraviolet light. Each of the examples and comparative examples described below describe light control sheets obtained by varying the illuminance and irradiation time as appropriate to obtain the optimum integrated light quantity. The light control sheets in Examples 1 to 7 and Comparative Example 1 all have the thickness of the light control layer set at 7.0 μm.

In Example 1, the illuminance of ultraviolet light was set to 10 mW/cm$^2$, and the coating film was irradiated with ultraviolet light so that the integrated light quantity was 600 mJ/cm$^2$.

Example 2

The light control sheet of Example 2 was obtained by the same method as in Example 1 except that the illuminance at the time of irradiating the coating film with ultraviolet light was changed to 15 mW/cm$^2$ in Example 1.

Example 3

The light control sheet of Example 3 was obtained by the same method as in Example 1 except that the illuminance at the time of irradiating the coating film with ultraviolet light was changed to 20 mW/cm$^2$ in Example 1.

Example 4

The light control sheet of Example 4 was obtained by the same method as in Example 1 except that the illuminance at the time of irradiating the coating film with ultraviolet light was changed to 25 mW/cm$^2$ in Example 1.

Example 5

The light control sheet of Example 5 was obtained by the same method as in Example 1 except that the illuminance at the time of irradiating the coating film with ultraviolet light was changed to 30 mW/cm$^2$ in Example 1.

Example 6

The light control sheet of Example 6 was obtained by the same method as in Example 1 except that the illuminance at the time of irradiating the coating film with ultraviolet light was changed to 35 mW/cm$^2$ in Example 1.

Example 7

The light control sheet of Example 7 was obtained by the same method as in Example 1 except that the illuminance at the time of irradiating the coating film with ultraviolet light was changed to 40 mW/cm$^2$ in Example 1.

Comparative Example 1

The light control sheet of Comparative Example 1 was obtained by the same method as in Example 1 except that the illuminance at the time of irradiating the coating film with ultraviolet light was changed to 200 mW/cm$^2$ in Example 1.
<Evaluation Method>
<Size of Hole>

The size of the hole was determined by observing the cross section of the resin layer using a scanning electron microscope. In determining the size of the holes, first, a liquid crystal composition which contains liquid crystal molecules was removed from the resin layer. A specimen having a square shape having a side length of 10 cm was cut out from each of the light control sheets of Examples 1 to 7 and the light control sheet of Comparative Example 1. The liquid crystal composition was removed from the resin layer by immersing each specimen in isopropyl alcohol. The liquid crystal composition can be removed from the specimen by immersing the specimen in an organic solvent that dissolves the liquid crystal composition but not the resin layer.

A scanning electron microscope was used to capture the cross section of the specimen from which the liquid crystal composition was removed. In this case, 30 rectangular regions were arbitrarily set for the cross section of the specimen. Then, for each region, an image was obtained using a scanning electron microscope so that the magnification was 1000 times. Here, 30 rectangular regions are set so that the distance between the rectangular regions adjacent to each other is 1 mm or more.

Ten holes were arbitrarily selected in each image and the size of each hole was measured. The maximum and minimum of sizes of the 10 holes were set to the maximum and minimum of sizes of the holes in the image. The maximum and minimum of sizes of the holes in each image were calculated. The largest of the maximum values obtained in 30 images was installed as the maximum value in the sizes of the holes in the specimen. The smallest of the minimum values obtained in the 30 images was set as the minimum value in the sizes of the holes in the specimen.

For holes in the image that had a circular shape, the diameter of the hole was set as the size of the hole. For holes in the image that had an elliptical shape, the major diameter of the hole was set as the size of the hole. For holes in the image that had an irregular shape, the diameter of the circle circumscribing the hole was set as the size of the hole.
<Formation Range>

In each of the images used for calculating the sizes of the holes, a formation range in which the holes are located in the thickness-wise direction of the light control layer was calculated with the boundary between the first alignment layer and the light control layer as a reference. The maximum value of the formation range obtained in 30 images was set as the formation range of the hole in the specimen.
<Percentage of Areas of Holes Relative to Area SL of Low-Density Portion>

In each of the images used for calculating the size of the hole, the area SL of the low-density portion and the area of each hole were calculated. Then, for each image, a ratio of the sum SD of the areas of the holes to the area SL of the low-density portion, as expressed in percentage ([SD/SL]× 100), was calculated. Then, for 30 images, an average value of a ratio of the sum of the areas of the holes to the area of the low-density portion, as expressed in percentage, was calculated. The average value was set as a percentage of the sum of the areas of the holes to the area of the low-density portion in each specimen. The area of each hole was calculated based on the number of pixels located in the area defined by the hole in each image.
<Haze>

For each of the light control sheets of Examples 1 to 7 and the light control sheet of Comparative Example 1, haze in the opaque state and haze in the transparent state were calculated. The haze was calculated in accordance with JIS K 7136: 2000. In each light control sheet, a state in which no potential difference is generated between the pair of transparent electrodes, that is, a state in which AC voltage is not applied between the pair of transparent electrodes, is set as the transparent state. Further, AC voltage is applied between the pair of transparent electrode layers, and a state in which the haze of the light control sheet is saturated was set as the opaque state.
<Clarity>

A clarity in the opaque state was calculated for each of the light control sheets in Examples 1 to 7 and the light control sheet in Comparative Example 1. The clarity is calculated from the following Formula (1), where the quantity of light $L_c$ is the quantity of light, among the light transmitted through the light control layer 31, that travels straight along the optical axis of the parallel light LP incident on the light control layer 31, and the quantity of light $L_R$ is the quantity of light of the narrow-angle scattered light having an angle off ±2.5° or less with respect to the optical axis of the parallel light LP. Further, as in the calculation of haze, AC voltage is applied between the pair of transparent electrode layers, and a state in which the haze of the light control sheet is saturated was set as the opaque state.

$$100\times(L_c-L_R)/(L_c+L_R) \qquad \text{Formula (1)}$$

<Linear Transmittance>

For each of the light control sheets of Example 1 to Example 7 and the light control sheet of Comparative Example 1, the linear transmittance in the opaque state, and the linear transmittance in the transparent state were calculated. In each light control sheet, a state in which no potential difference is generated between the pair of transparent electrodes, that is, a state in which AC voltage is not applied between the pair of transparent electrodes, is set as the transparent state. Further, AC voltage is applied between the pair of transparent electrode layers, and a state in which the haze of the light control sheet is saturated was set as the opaque state.
<Evaluation Result>

The results of capturing the cross-section of each test piece were as shown in FIGS. 4 to 11. Further, the results of each evaluation were as shown in Table 1 and Table 2 below.

Figure 11:
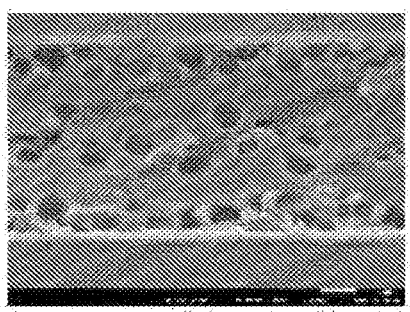
FIG. 11 is an SEM image obtained by capturing a cross-sectional structure of a light control sheet of Comparative Example 1.

FIGS. 4 to 10 show, in order, SEM images obtained by capturing the cross sections of the light control sheets of Examples 1 to 7. Further, FIG. 11 shows an SEM image obtained by capturing the cross section of the light control sheet of Comparative Example 1.

TABLE 1

|  |  | Unit | Example 1 | Example 2 | Example 3 | Example 4 |
|---|---|---|---|---|---|---|
| Size (Minimum) |  | μm | 1.4 | 1.3 | 1.2 | 1.3 |
| Size (Maximum) |  | μm | 2.7 | 2.4 | 2.3 | 2.1 |
| Formation range |  | μm | 2.8 | 2.8 | 2.7 | 2.7 |
| Hole (Low-density portion) |  |  | Not present | Not present | Not present | Not present |
| SD/SL × 100 |  | % | 0 | 0 | 0 | 0 |
| Opaque state | Clarity | % | 70.5 | 64.0 | 62.3 | 63.6 |
|  | Haze | % | 93.2 | 93.5 | 93.3 | 94.0 |
|  | Linear transmittance | % | 6.0 | 5.8 | 5.9 | 5.4 |
| Transparent state | Haze | % | 11.5 | 8.7 | 8.6 | 7.6 |
|  | Linear transmittance | % | 77.2 | 80.2 | 80.4 | 81.4 |

TABLE 2

|  |  | Unit | Example 5 | Example 6 | Example 7 | Comparative Example 1 |
|---|---|---|---|---|---|---|
| Size (Minimum) |  | μm | 1.2 | 1.2 | 1.1 | 0.8 |
| Size (Maximum) |  | μm | 1.8 | 2.0 | 1.8 | 1.5 |
| Formation range |  | μm | 2.6 | 3.5 | 3.5 | 3.4 |
| Hole (Low-density portion) |  |  | Not present | Not present | Present | Present |
| SD/SL × 100 |  | % | 0 | 0 | 8 | 11 |
| Opaque state | Clarity | % | 59.9 | 62.5 | 74.1 | 97.5 |
|  | Haze | % | 94.5 | 95.1 | 95.0 | 88.2 |
|  | Linear transmittance | % | 4.9 | 4.4 | 4.4 | 10.5 |
| Transparent state | Haze | % | 7.1 | 11.9 | 31.6 | 53.5 |
|  | Linear transmittance | % | 81.7 | 77.6 | 60.5 | 42.1 |

As shown in FIG. 11, in the light control sheet of Comparative Example 1, it was found that holes were formed substantially uniformly throughout the entire light control sheet in the thickness of the light control sheet. In other words, it was found that the light control sheet does not have a high-density portion having a relatively high density of liquid crystal molecules and a low-density portion having a relatively low density of liquid crystal molecules.

On the other hand, as shown in FIGS. 4 to 10, in the light control sheets of Examples 1 to 7, it was found that a high-density portion was formed at a portion of the light control sheet in contact with each alignment layer, and that a low-density portion was formed between two high-density portions in the thickness-wise direction of the light control sheet. In particular, it was found that the light control sheet of Example 7 also had holes in the low-density portion, while the light control sheets of Examples 1 to 6 had no holes in the low-density portion.

It was found that the haze values in the transparent state in the light control sheets of Examples 1 to 7 were much smaller than the haze values in the transparent state in the light control sheet of Comparative Example 1. Therefore, since the light control sheet has a high-density portion and a low-density portion, the haze value of the light control sheet in the transparent state is lowered, that is, the transparency of the light control sheet 21 in the transparent state is enhanced.

As shown in Table 1 and Table 2, the ratio of the sum SD of the areas of the holes to the area SL of the low-density portion, as expressed in percentage, was found to be 0% in Example 1, 0% in Example 2, and 0% in Example 3. In addition, the ratio of the sum SD of the areas of the holes to the area SL of the low-density portion, as expressed in percentage, was found to be 0% in Example 4, 0% in Example 5, 0% in Example 6, and 8% in Example 7. On the other hand, it was found that a ratio of the sum of the areas of the holes to the area SL of the low-density portion, as expressed in percentage, was 11% in Comparative Example 1.

The haze values of the light control sheets of Examples 1 to 6 in their transparent state are further improved than the haze value of the light control sheet of Example 7 in its transparent state. Thus, it can be said that the haze value in the transparent state is further improved by the fact that the ratio of the sum SD of the areas of the holes to the area SL of the low-density portion, as expressed in percentage, is 10% or less.

Further, in the light control sheets of Examples 1 to 7, it was found that the minimum of sizes of the holes was 1.1 μm or more and 1.4 μm or less, and was 1.0 μm or more. On the other hand, in the light control sheet of Comparative Example 1, it was found that the minimum of sizes of the holes was 0.8 μm, and was less than 1.0 μm. On the other hand, in the light control sheets of Examples 2 to 7 and the light control sheet of Comparative Example 1, it was found that the maximum of sizes of the holes was 1.5 μm or more and 2.4 μm or less, and was 2.5 μm or less. On the other hand, in the light control sheet of Comparative Example 1, it was found that the maximum of sizes of the holes was 2.7 μm, and exceeds 2.5 μm.

Since the light control sheets of Examples 1 to 7 have a minimum of sizes of the holes of 1.0 μm or more, it can be said that the haze value in the transparent state is lower than that of the light control sheet of Comparative Example 1 having a minimum of sizes of the holes of less than 1.0 µm. Since the light control sheet of Example 2 has a maximum of sizes of the holes of 2.5 µm or less, it can be said that the haze value in the transparent state is lower than that of the light control sheet of Comparative Example 1 having a maximum of sizes of the holes of 2.5 µm or more.

Further, in Examples 1 to 5, it was found that holes are formed within a range of 3.0 µm with respect to the alignment layer. On the other hand, in Example 6, Example 7, and Comparative Example 1, it was found that holes were formed in a range exceeding 3.0 µm with respect to the alignment layer. Since the haze value in the transparent state is lower in Examples 1 to 5 than in Examples 6 and 7, it can be said that the formation of a hole within a range of 3.0 µm from the alignment film in Examples 1 to 5 is one of the factors that lowers the haze value in the transparent state.

In Examples 1 to 7 and Comparative Example 1, the thicknesses of the light control layers were set to be constant and the differences due to changing the exposure conditions were evaluated. In Examples 8 to 10 and Comparative Examples 2 and 3 described below, the exposure conditions were set constant and the differences due to the change in the thickness of the light control layer were evaluated.

Example 8

In Example 8, a light control layer having a thickness of 3.0 µm was formed by reducing the amount of coating liquid to be applied on the vertical alignment layer as compared with Example 1. In each of the following examples, the illuminance at the time of irradiating the coating film with ultraviolet light was set to 20 mW/cm$^2$ and the integrated light quantity was set to 600 mJ/cm$^2$.

Example 9

The light control sheet of Example 9 was prepared by the same method as in Example 8, except that a light control layer having a thickness of 7.0 µm was obtained by increasing the amount of coating liquid to be applied on the vertical alignment layers.

Example 10

The light control sheet of Example 10 was prepared by the same method as in Example 8, except that a light control layer having a thickness of 8.0 µm was obtained by increasing the amount of coating liquid to be applied on the vertical alignment layers.

Comparative Example 2

The light control sheet of Comparative Example 2 was prepared by the same method as in Example 8, except that a light control layer having a thickness of 10.0 µm was obtained by increasing the amount of coating liquid to be applied on the vertical alignment layers.

Comparative Example 3

The light control sheet of Comparative Example 3 was prepared by the same method as in Example 8, except that a light control layer having a thickness of 16.0 µm was obtained by increasing the amount of coating liquid to be applied on the vertical alignment layers.

<Evaluation Method>
<Image>

The cross sections of the light control sheets of Examples 8 to 10 and the light control sheets of Comparative Examples 2 and 3 were captured using the same method as in the case where the cross sections of the light control sheets of Examples 1 to 7 and the light control sheet of Comparative Example 1 were captured.

<Size of Hole>

The sizes of the holes in the light control sheets of Examples 8 to 10 and the light control sheets of Comparative Examples 2 and 3 were calculated using the same method as that used to calculate the sizes of the holes in the light control sheets of Examples 1 to 7 and the light control sheet of Comparative Example 1. Thus, in each light control sheet, the minimum and the maximum of sizes of the holes were calculated.

<Evaluation Result>

Figure 12:
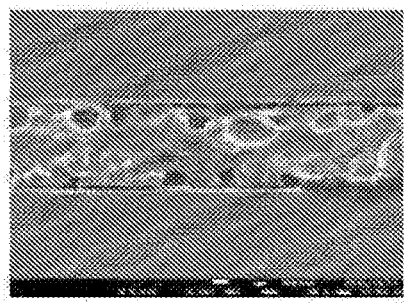
FIG. 12 is an SEM image obtained by capturing a cross-sectional structure of a light control sheet of Example 8.
Figure 13:
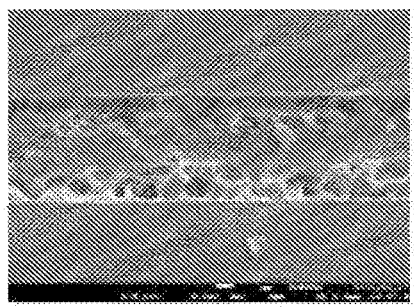
FIG. 13 is an SEM image obtained by capturing a cross-sectional structure of a light control sheet of Example 9.
Figure 14:
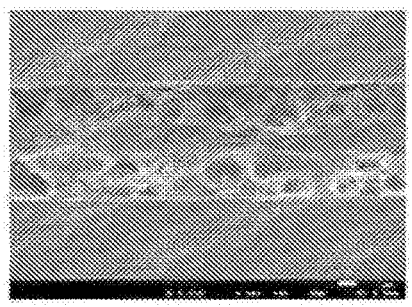
FIG. 14 is an SEM image obtained by capturing a cross-sectional structure of a light control sheet of Example 10.
Figure 15:
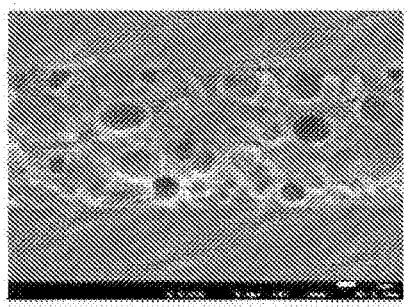
FIG. 15 is an SEM image obtained by capturing a cross-sectional structure of a light control sheet of Comparative Example 2.
Figure 16:
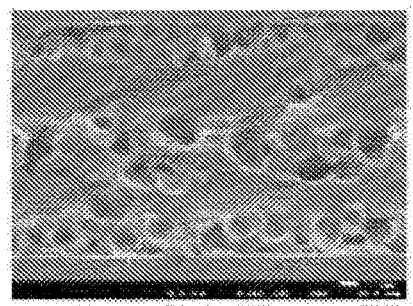
FIG. 16 is an SEM image obtained by capturing a cross-sectional structure of a light control sheet of Comparative Example 3.

The results of capturing the cross sections of the light control sheet of Examples 8 to 10 and the cross sections of the light control sheet of Comparative Examples 2 and 3 were as shown in FIGS. 12 to 16. FIGS. 12 to 14 show, in order, SEM images obtained by capturing the cross sections of the light control sheet of Examples 8 to 10. Further, FIGS. 15 and 16 show, in order, SEM images obtained by capturing the cross sections of the light control sheet of Comparative Examples 2 and 3.

As shown in FIGS. 12 to 14, when the thickness of the light control layer is 3.0 µm or more and 8.0 µm or less, it was recognized that a plurality of holes are formed in line with the boundary between each alignment layer and the light control sheet. On the other hand, when the thickness of the light control layer is 3.0 µm or more and 8.0 µm or less, it was found that no holes were formed in the central portion of the light control layer in the thickness of the light control layer.

On the other hand, as shown in FIG. 15, when the thickness of the dimming layer is 10.0 µm, it was found that a plurality of holes are irregularly formed in the entire light control layer. In detail, when the thickness of the light control layer is 10 µm, it was found that the light control layer did not have a high-density portion and a low-density portion. Further, as shown in FIG. 16, when the thickness of the light control layer is 16.0 µm, it was recognized that a plurality of holes are formed at a density similar to the density of the holes at the boundary between each alignment layer and the light control sheet at the central portion of the light control layer in the thickness-wise direction of the light control layer. In the thickness-wise direction of the light control layer, it was also recognized that a plurality of holes are formed between the holes located at the central portion and the holes located at the boundary between the alignment layers and the light control layer.

It was found that the minimum and maximum of sizes of the holes in each light control sheet were in the range of 1.0 µm or more and 2.5 µm or less.

As described above, the light control sheet according to an embodiment achieves the following advantageous effects.

(1) Since the density of the liquid crystal composition 31LC is high in the region where the distance from the alignment layers 32 and 33 is small, it is possible to increase the amount of liquid crystal molecules LCM aligned by the alignment regulating force of the alignment layers 32 and 33 in the plurality of liquid crystal molecules LCM. Therefore, it is possible to increase the transparency of the light control sheet 21 even when there is no voltage difference between the first transparent electrode layer 34 and the second transparent electrode layer 35.

(2) Since the thickness T31 of the light control layer 31 is 3.0 μm or more and 8.0 μm or less, the formation of the holes 31D at positions distant from the pair of surfaces facing away from each other in the thickness-wise direction of the light control layer 31 is suppressed. Further, since the size of the hole is 1.0 μm or more and 2.5 μm or less, the liquid crystal composition 31LC is maintained in the vicinity of the alignment layers 32 and 33. Therefore, it is possible to increase the transparency of the light control sheet 21 even when there is no voltage difference between the first transparent electrode layer 34 and the second transparent electrode layer 35.

(3) In the light control layer 31, the liquid crystal molecules LCM are aligned in accordance with the alignment regulating force of the alignment layers 32 and 33 in the vicinity of a pair of surfaces facing away from each other in the thickness-wise direction of the light control layer 31. Therefore, it is possible to further increase the transparency of the light control sheet 21 even when there is no voltage difference between the first transparent electrode layer 34 and the second transparent electrode layer 35.

(4) Since the densities of the holes 31D in the high-density portions 31H1 and 31H2 are higher than the density of the holes 31D in the low-density portion 31L, the density of the liquid crystal composition 31LC in the high-density portions 31H1 and 31H2 can be made higher than the density of the liquid crystal composition 31LC in the low-density portion 31L.

(5) Since the respective holes 31D in the first high-density portion 31H1 and the respective holes 31D in the second high-density portion 31H2 can hold the liquid crystal composition 31LC in the vicinity of the alignment layers 32 and 33, the alignment regulating force of the alignment layers 32 and 33 is easily applied to the entire liquid crystal composition 31LC held in the respective holes 31D.

(6) Since the ratio of the sums SD of the holes 31D in the low-density portion 31L to the area SL of the low-density portion 31L, as expressed in percentage, is 10% or less, the ratio of the liquid crystal composition 31LC held by the holes 31D in the low-density portion 31L can be reduced.

(7) When the low-density portion 31L does not include any of the holes 31D, the ratio of liquid crystal molecules LCM aligned in accordance with the alignment regulating force of the alignment layers 32 and 33 is increased among the liquid crystal molecules LCM contained in the light control layer 31. Therefore, the transparency of the light control sheet 21 can be further increased in a state where a voltage difference does not occur between the first transparent electrode layer 34 and the second transparent electrode layer 35.

(8) Since the holes 31D are located within a range of 3.0 μm or less from the corresponding one of the alignment layers 32 and 33, in a thickness-wise direction, as viewed in a cross section of the light control layer, it is possible to increase the reliability with which the liquid crystal molecules LCM held in each of the holes 31D are aligned in accordance with the alignment regulating force.

The above-described embodiments can be modified and implemented as follows.

<Alignment Layer>

The light sheet 21 includes the first alignment layer 32, but does not have to include the second alignment layer 33. In this case, by providing the first high-density portion 31H1 and the low-density portion 31L in the light control layer 31, an effect similar to that of (1) can be obtained.

<Light Control Layer>

While the density of the liquid crystal composition 31LC is the lowest in the central portion of the light control layer 31 in the thickness of the light layer 31, the light control layer 31 may not have the high-density portions 31H1 and 31H2 in contact with the alignment layers 32 and 33. Even in this case, since the density of the liquid crystal composition 31LC is the lowest in the central portion of the light control layer 31 in the thickness of the light control layer 31, an effect similar to that of (1) can be obtained.

When the density of the liquid crystal composition 31LC is the lowest in the central portion of the light control layer 31 in the thickness of the light control layer 31 and when there are no high-density portions 31H1 and 31H2 in contact with the alignment layers 32 and 33, the holes 31D may be located within a range of 3.0 μm or less from the alignment layers 32 and 33 in the cross section of the light control layer 31 in the thickness of the light control layer 31. In this case, effects similar to that of (1) and (8) can be obtained.

In the light control sheet 21 including the light control layer 31 having the high-density portions 31H1, 31H2 and the low-density portion 31L, the thickness of the light control layer 31 may be 2 times or more of a minimum of sizes of the holes and less than 10 μm, and the sizes of the holes 31D may be 0.38 μm or more and 3.0 μm or less. In this case, effects similar to that of (1) and (2) can be obtained.

In the light control sheet 21 including the light control layer 31 having the lowest density of the liquid crystal composition 31LC in the central portion of the light control layer 31 in the thickness of the light control layer 31, the thickness of the light control layer 31 may be 2 times or more of a minimum of sizes of the holes 31D and less than 10 μm, and the sizes of the holes 31D may be 0.38 μm or more and 3.0 μm or less. In this case, effects similar to that of (1) and (2) can be obtained.

<Antiviral Film>

As will be described below with reference to FIGS. 17 and 18, the light control sheet 21 may include an antiviral film. The light control sheet 21 described below includes an antiviral layer located on the opposite side of the transparent substrates 36 and 37 to the transparent electrode layers 34 and 35.

Figure 17:
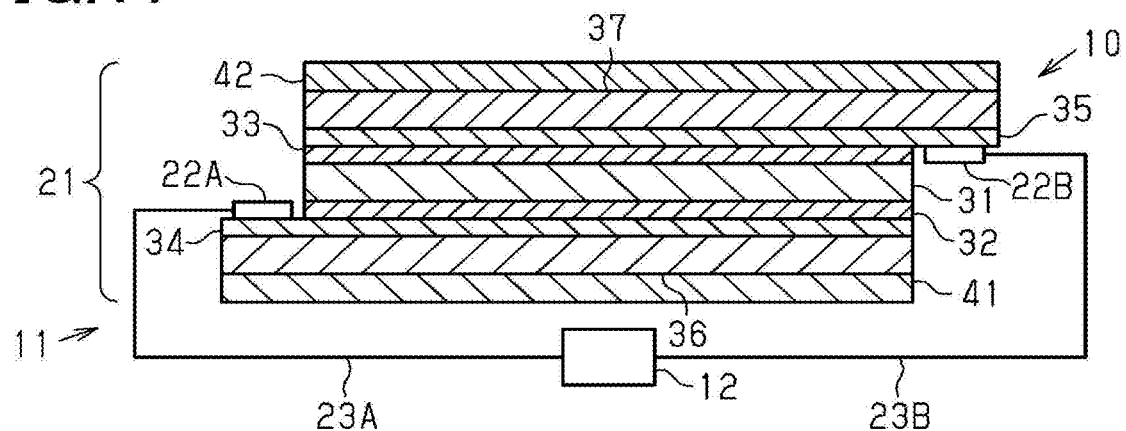
FIG. 17 is a cross-sectional view showing a structure of a modification of a light control device.

As shown in FIG. 17, the light control sheet 21 includes a first antiviral film 41 and a second antiviral film 42. The first antiviral film 41 is located on a surface of the first transparent substrate 36 on a side opposite to that on which the first transparent electrode layer 34 is located. The second antiviral film 42 is located on a surface of the second transparent substrate 37 on a side opposite to that on which the second transparent electrode layer 35 is located. In the example shown in FIG. 17, the light control sheet 21 includes the first antiviral film 41 and the second antiviral film 42, but the light control sheet 21 may include only one of the first antiviral film 41 and the second antiviral film 42. When the light control sheet 21 includes the first antiviral film 41 and the second antiviral film 42, the light control sheet 21 can enhance the effectiveness of the light control sheet 21 in reducing viruses and in reducing the difference in appearance between the front and rear surfaces of the light control sheet 21.

Figure 18:
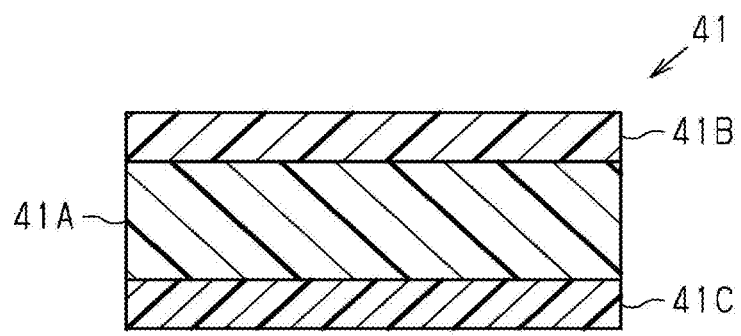
FIG. 18 is a cross-sectional view showing the structure of an antiviral film provided in the light control device shown in FIG. 17.

FIG. 18 shows a cross-sectional structure of the first antiviral film 41. Incidentally, the second antiviral film 42 has a cross-sectional structure common to the first antiviral film 41 while being affixed to a different object from the object to which the first antiviral film 41 is attached.

Therefore, while the cross-sectional structure of the first antiviral film 41 will be described below, a description of the cross-sectional structure of the second antiviral film 42 will be omitted.

As shown in FIG. 18, the first antiviral film 41 includes a substrate layer 41A, an antiviral layer 41B, and an adhesive layer 41C. Of the surfaces of the substrate layer 41A facing away from each other, one surface is provided with the antiviral layer 41B and the other surface is provided with the adhesive layer 41C. The substrate layer 41A, may be made of, for example polyethylene terephthalate or polyolefin. The substrate layer 41A has a thickness of, for example, 80 μm or more and 120 μm or less.

The adhesive layer 41C is highly adhesive to the object to which it is attached, and may not be peeled off from the object to which it is attached, or even if it can be peeled off, it may not be possible to reattach it. Alternatively, the adhesive layer 41C may be capable of being repeatedly peeled off from and attached to the object to which it is attached, while having low adhesiveness to the object to which it is attached. The adhesive layer 41C having high adhesiveness is formed of, for example, an olefin-based adhesive. The adhesive layer 41C having low adhesiveness is formed of, for example, a polyethylene terephthalate-based adhesive or an olefin-based adhesive. The adhesive layer 41C has a thickness of, for example, several μm. The antiviral film 41 is attached to the first transparent substrate 36, which is the object to which it is attached, by the adhesive layer 41C.

The antiviral layer 41B contains a synthetic resin and an antiviral agent. Examples of the synthetic resin include a melamine-based resin, a urethane-based resin, and an acrylic resin. The synthetic resin may be an ultraviolet curable resin. The antiviral agent may be, for example, an organic antiviral agent. Examples of the organic antiviral agent include bis(2-pyridylthio)zinc 1,1'-dioxide, 2-(4-thiazolyl)benzimidazole, and organic nitrogen sulfur halogen compounds.

The antiviral agent may also be composed of, for example, a porous material and metal ions supported on the porous material. Examples of the porous material include zeolite, apatite, and zirconia. The metal ion may be silver ions, copper ions, zinc ions, or the like. The antiviral agent may have an antibacterial function in addition to the antiviral function.

The metal ions supported on the porous material have a positive charge. Therefore, the application of AC voltage between the pair of transparent electrode layers 34 and 35 may cause metal ions to migrate in the thickness of the first antiviral film 41.

As described above, the antiviral layer 41B containing an antiviral agent is separated from the transparent substrates 36 and 37 by the substrate layer 41A and the adhesive layer 41C. Therefore, the metal ions are prevented from migrating outside the antiviral films 41 and 42 and from migrating inside the antiviral films 41 and 42 of the light control sheet 21, in response to the application of AC voltage.

When the light control sheet 21 is provided with the antiviral films 41 and 42, the increase in the capacitance of the light control sheet 21 is suppressed compared with the case where the transparent substrates 36 and 37 contain an antiviral agent. Further, since the antiviral layer 41B of the antiviral films 41 and 42 contains an antiviral agent, the adhesive layer antiviral agent is less likely to migrate beyond the antiviral films 41 and 42 and migrate inside of the light control sheet 21 compared to the case where the adhesive layer contains an antiviral agent. Further, when the light control sheet 21 includes the antiviral films 41 and 42, the uneven distribution of metal ions in the light control layer 31 is suppressed as compared with the case where the light control layer 31 contains an antiviral agent, thereby suppressing the deterioration of the light control layer 31. Even when the antiviral agent is an organic antiviral agent, the antiviral films 41 and 42 suppress the reaction between the liquid crystal molecules LCM, which is contained in the light control layer 31, and the antiviral agent, thereby suppressing the deterioration of the light control layer 31.

In forming the antiviral layer 41B, for example, a coating liquid containing the above-described synthetic resin, antiviral agent, and solvent is prepared. The antiviral layer 41B is formed by applying the coating liquid to one surface of the substrate layer 41A and then curing the coating liquid.

From the viewpoint of further enhancing the privacy-protecting function in the light control sheet 21, the antiviral films 41 and 42 preferably have a haze of 30% or more. From the viewpoint of further enhancing transparency of the light control sheet 21 in a state where no voltage is applied, the antiviral films 41 and 42 preferably have a haze of less than 30%.

The light control sheet 21 may include only the antiviral layer of the antiviral films 41 and 42 described above. That is, the light control sheet 21 may include the antiviral layer located on each transparent substrate 36 and 37. Alternatively, the light control sheet 21 may include the antiviral layer only on one of the first transparent substrate 36 and the second transparent substrate 37. The antiviral layer is formed by applying the coating liquid described above to each transparent substrate 36 and 37.

In this case, compared with the case where the light control sheet 21 includes the antiviral films 41 and 42, it is possible to reduce the thickness and weight of the light control sheet 21 having antiviral properties. In addition, since only one layer is located outside the transparent substrates 36 and 37, it is possible to enhance optical properties such as light transmittance and haze.

The light control sheet 21 may further comprise the antiviral films 41 and 42 as described above, in addition to the antiviral layer located on the transparent substrates 36 and 37. In this case, since the light control sheet 21 includes both the antiviral films 41 and 42 and the antiviral layer, it is possible to enhance the antiviral properties of the light control sheet 21.

The light control sheet 21 may include a pair of antiviral layers and a pair of antiviral films, or may include only one antiviral layer and one antiviral film, respectively. When the light control sheet 21 includes only one antiviral layer and one antiviral film, the antiviral layer may be disposed on one side of the first transparent substrate 36 and the second transparent substrate 37, and the antiviral film may be disposed on the other side. Alternatively, when the light control sheet 21 includes only one antiviral layer and one antiviral film, the antiviral layer may be disposed on either of the first transparent substrate 36 and the second transparent substrate 37, and the antiviral film may be located on the antiviral layer.

The light control sheet 21 may also include a pair of antiviral layers and one antiviral film. Alternatively, the light control sheet 21 may also include one antiviral layer and a pair of antiviral films.

Not only the light control sheet 21 described above but a light controller may include the antiviral films 41 and 42. The light controller includes the light control sheet 21, and a transparent support for supporting the light control sheet 21. The light controller may have one or two transparent supports. When the light controller includes one transparent support, the transparent support is attached to the first transparent substrate 36 or the second transparent substrate 37 of the light control sheet 21 by a transparent adhesive layer. When the light controller includes two transparent supports, one transparent support is attached to the first transparent substrate 36 by a transparent adhesive layer, and the other transparent support is attached to the second transparent substrate 37 by a transparent adhesive layer. The light controller may have antiviral films on both of the pair of surfaces facing away from each other in the thickness-wise direction of the light controller, or may have antiviral films on only one of the pair of surfaces facing away from each other.

The light controller may include only the antiviral layer of the antiviral films 41 and 42. That is, the light controller may include an antiviral layer located on at least one of the pair of surfaces facing away from each other in the thickness-wise direction of the light controller.

The light controller may include both an antiviral layer and an antiviral film. The light controller may include a pair of antiviral layers and a pair of antiviral films, or may include only one antiviral layer and one antiviral film, respectively. When the light controller includes only one antiviral layer and one antiviral film, the antiviral layer may be disposed on one surface of the pair of surfaces facing away from each other in the thickness-wise direction of the light controller, and the antiviral film may be located on the other surface of the pair of surfaces facing away from each other. Alternatively, the antiviral layer may be disposed on one of the pair of surfaces facing away from each other in the thickness-wise direction of the light controller, and the antiviral film may be located on the antiviral layer.

The light controller may also include a pair of antiviral layers and one antiviral film. Alternatively, the light controller may also include one antiviral layer and a pair of antiviral films.

The transparent support of the light controller may comprise an antiviral layer on the surface to be attached to the light control sheet 21 by an adhesive layer.

The present application addresses the following. In the background section, a structure of a reverse-type light control sheet is described. The structure of a reverse-type light control sheet in which the opacity is realized when there is a potential difference between a pair of transparent electrode layers is also required to increase transparency even when there is no potential difference between a pair of transparent electrode layers.

The present invention has an aspect to provide a light control sheet capable of enhancing transparency even when there is no potential difference between a pair of transparent electrode layers.

A light control sheet includes a first transparent electrode layer which is configured to receive voltage, a second transparent electrode layer, a light control layer, and a first alignment layer. The light control layer includes a resin layer and a liquid crystal composition. The resin layer is located between the first transparent electrode layer and the second transparent electrode layer. The resin layer has a plurality of holes dispersed therein. The liquid crystal composition contains liquid crystal molecules and occupies the holes. The first alignment layer is arranged between the first transparent electrode layer and the light control layer and is configured to increase a haze of the light control layer in response to application of the voltage. The light control layer includes a first high-density portion and a low-density portion. The first high-density portion is higher in density of the liquid crystal composition per unit thickness thereof than the low-density portion. The low-density portion is lower in density of the liquid crystal composition per unit thickness thereof than the first high-density portion. The first high-density portion is in contact with the first alignment layer.

A light control sheet includes a first transparent electrode layer, a second transparent electrode layer, a light control layer, and an alignment layer. The first transparent electrode layer is configured to receive voltage. The light control layer includes a resin layer and a liquid crystal composition. The resin layer is located between the first transparent electrode layer and the second transparent electrode layer. The resin layer has a plurality of holes dispersed therein. The liquid crystal composition contains liquid crystal molecules and occupies the holes. The alignment layer is arranged between the first transparent electrode layer and the light control layer and is configured to increase a haze of the light control layer in response to application of the voltage. The light control layer has a central portion occupying a central area of a thickness of the light control layer and the central portion is lowest in density in the thickness of the light control layer.

Each of the above configurations is configured to have the density of the liquid crystal composition being high in the region where the distance from the alignment layer is close. Thus, the amount of liquid crystal molecules aligned by the alignment regulating force of the alignment layer can be increased in a plurality of liquid crystal molecules. Therefore, it is possible to increase the transparency of the light control sheet even when there is no voltage difference between the first transparent electrode layer and the second transparent electrode layer.

A light control sheet includes a first transparent electrode layer, a second transparent electrode layer, a light control layer, and an alignment layer. The first transparent electrode layer is configured to receive voltage. The light control layer includes a resin layer and a liquid crystal composition. The resin layer is located between the first transparent electrode layer and the second transparent electrode layer. The resin layer has a plurality of holes dispersed therein. The liquid crystal composition contains liquid crystal molecules and occupies the holes. The alignment layer is arranged between the first transparent electrode layer and the light control layer and is configured to increase a haze of the light control layer in response to application of the voltage. The light control layer has a thickness of 2 times or more of a minimum of sizes of the holes and less than 10 μm, and the holes have a size of 0.38 μm or more and 3.0 μm or less.

According to the above configuration, since the thickness of the light control layer is 2 times or more of a minimum of sizes of the holes and 10 μm or less, the formation of holes at positions distant from the pair of surfaces facing away from each other in the thickness-wise direction of the light control layer is suppressed. Further, since the size of the holes is 0.38 μm or more and 3.0 μm or less, the liquid crystal composition is held in the vicinity of the alignment layer. Therefore, it is possible to increase the transparency of the light control sheet even when there is no voltage difference between the first transparent electrode layer and the second transparent electrode layer.

Obviously, numerous modifications and variations of the present invention are possible in light of the above teachings. It is therefore to be understood that within the scope of the appended claims, the invention may be practiced otherwise than as specifically described herein.

What is claimed is:

1. A light control sheet, comprising:
   a first transparent electrode layer that receives a voltage;
   a second transparent electrode layer;
   an alignment layer formed between the first transparent electrode layer and the light control layer such that a haze of the light control layer is increased in response to application of the voltage to the first transparent electrode layer; and
   a light control layer including a resin layer formed between the first transparent electrode layer and the second transparent electrode layer such that the resin layer has a plurality of holes and includes a liquid crystal composition including liquid crystal molecules in the plurality of holes,
   wherein the light control layer is formed such that a minimum size of the holes is 1.0 µm or more and that a maximum size of the holes is 2.5 µm or less, and the light control layer includes a high-density portion and a low-density portion such that the high-density portion is in contact with the alignment layer and includes the liquid crystal composition at a density higher than a density of the liquid crystal composition in the low-density portion per unit thickness of the light control layer.

2. The light control sheet according to claim 1, further comprising:
   a second alignment layer formed between the light control layer and the second transparent electrode layer
   wherein the light control layer further includes a second high-density portion formed in contact with the second alignment layer and including the liquid crystal composition at a density higher than the density of the liquid crystal composition in the low-density portion such that the low-density portion is formed between the high-density portion and the second high-density portion.

3. The light control sheet according to claim 2, wherein a density of each of the holes per unit thickness thereof is defined by a value obtained by dividing an area of a corresponding one of the holes by a thickness of the light control layer, in a cross section of the light control layer, a first density is a density of each of the holes in the high-density portion per unit thickness thereof, the second density is a density of each of the holes in the second high-density portion per unit thickness thereof, the third density is a density of each of the holes in the low-density portion per unit thickness thereof, and the first density and the second density are higher than the third density.

4. The light control sheet according to claim 2, wherein each of the holes in the high-density portion is in contact with the alignment layer, and each of the holes in the second high-density portion is in contact with the second alignment layer.

5. The light control sheet according to claim 1, wherein the light control layer has a cross section in a thickness-wise direction of the light control layer, which satisfies that a ratio, SD/SL×100, of 10% or less, where SD is a sum of areas of the holes in the low-density portion, and SL is an area of the low-density portion.

6. The light control sheet according to claim 1, wherein the low-density portion includes no holes.

7. The light control sheet according to claim 1, wherein the light control layer is formed such that the holes are present in a range of 3.0 µm or less from the alignment layer in a thickness of the light control layer.

8. The light control sheet according to claim 1, further comprising:
   a transparent substrate positioned on an opposite side of the first transparent electrode layer to the light control layer; and
   an antiviral layer including an antiviral agent and formed on an opposite side of the transparent substrate to the first transparent electrode layer.

9. A light control sheet, comprising:
   a first transparent electrode layer that receives a voltage;
   a second transparent electrode layer;
   a light control layer including a resin layer formed between the first transparent electrode layer and the second transparent electrode layer such that the resin layer has a plurality of holes and includes a liquid crystal composition including liquid crystal molecules in the plurality of holes; and
   an alignment layer formed between the first transparent electrode layer and the light control layer such that a haze of the light control layer is increased in response to application of the voltage to the first transparent electrode layer,
   wherein the light control layer is formed such that a minimum size of the holes is 1.0 µm or more and that a maximum size of the holes is 2.5 µm or less, and the light control layer has a central portion of a thickness of the light control layer such that the central portion is lowest in density in the thickness of the light control layer.

10. The light control sheet according to claim 9, wherein the light control layer is formed such that the holes are present in a range of 3.0 µm or less from the alignment layer in a thickness of the light control layer.

11. The light control sheet according to claim 9, further comprising:
    a transparent substrate positioned on an opposite side of the first transparent electrode layer to the light control layer; and
    an antiviral layer including an antiviral agent and formed on an opposite side of the transparent substrate to the first transparent electrode layer.

12. A light control sheet, comprising:
    a first transparent electrode layer that receives a voltage;
    a second transparent electrode layer;
    a light control layer including a resin formed between the first transparent electrode layer and the second transparent electrode layer such that the resin layer has a plurality of holes and includes a liquid crystal composition including liquid crystal molecules in the plurality of holes; and
    an alignment layer formed between the first transparent electrode layer and the light control layer such that a haze of the light control layer is increased by application of the voltage to the first transparent electrode layer,
    wherein the light control layer is formed such that a minimum size of the holes is 1.0 µm or more and that a maximum size of the holes is 2.5 µm or less, and the light control layer has a thickness of 2 times or more of the minimum size of the holes and less than 10 µm.

13. The light control sheet according to claim 12, wherein the light control layer is formed such that the holes are present in a range of 3.0 µm or less from the alignment layer in a thickness of the light control layer.

14. The light control sheet according to claim 12, further comprising:

a transparent substrate positioned on an opposite side of the first transparent electrode layer to the light control layer; and an antiviral layer including an antiviral agent and formed on an opposite side of the transparent substrate to the first transparent electrode layer.

15. The light control sheet according to claim 1, wherein the light control layer has a cross section in a thickness-wise direction of the light control layer, which satisfies that a ratio, SD/SL×100, of 5% or less, where SD is a sum of areas of the holes in the low-density portion, and SL is an area of the low-density portion.

16. The light control sheet according to claim 1, wherein the light control layer has a cross section in a thickness-wise direction of the light control layer, which satisfies that a ratio, SD/SL×100, of 0%, where SD is a sum of areas of the holes in the low-density portion, and SL is an area of the low-density portion.

17. The light control sheet according to claim 1, wherein the light control layer is formed such that the minimum size of the holes is in a range of 1.0 μm to 1.4 μm.

18. The light control sheet according to claim 1, wherein the light control layer is formed such that the maximum size of the holes is in a range of 1.5 μm to 2.5 μm.

19. The light control sheet according to claim 1, wherein the light control layer is formed such that the minimum size of the holes is in a range of 1.0 μm to 1.4 μm and that the maximum size of the holes is in a range of 1.5 μm to 2.5 μm.

20. The light control sheet according to claim 19, wherein the light control layer has a cross section in a thickness-wise direction of the light control layer, which satisfies that a ratio, SD/SL×100, of 10% or less, where SD is a sum of areas of the holes in the low-density portion, and SL is an area of the low-density portion, and the light control layer is formed such that the holes are present in a range of 3.0 μm or less from the alignment layer in a thickness of the light control layer.

* * * * *